(12) United States Patent
Hong

(10) Patent No.: US 11,429,923 B2
(45) Date of Patent: *Aug. 30, 2022

(54) METHOD AND DEVICE FOR DETERMINING MAIL PATH INFORMATION

(71) Applicant: Yong Hong, Changsha (CN)

(72) Inventor: Yong Hong, Changsha (CN)

( * ) Notice: Subject to any disclaimer, the term of this patent is extended or adjusted under 35 U.S.C. 154(b) by 503 days.

This patent is subject to a terminal disclaimer.

(21) Appl. No.: 16/582,633

(22) Filed: Sep. 25, 2019

(65) Prior Publication Data

US 2020/0019934 A1 Jan. 16, 2020

Related U.S. Application Data

(63) Continuation of application No. 14/767,468, filed as application No. PCT/CN2013/074342 on Apr. 18, 2013, now Pat. No. 10,460,284.

(30) Foreign Application Priority Data

Mar. 21, 2013 (CN) .................. 201310092641.X

(51) Int. Cl.
*G06Q 10/08* (2012.01)
*G06Q 50/28* (2012.01)

(52) U.S. Cl.
CPC ....... *G06Q 10/08355* (2013.01); *G06Q 10/08* (2013.01); *G06Q 50/28* (2013.01)

(58) Field of Classification Search
None
See application file for complete search history.

(56) References Cited

U.S. PATENT DOCUMENTS

| 5,991,739 A | 11/1999 | Cupps et al. |
| 7,225,983 B2 | 6/2007 | Park et al. |

(Continued)

FOREIGN PATENT DOCUMENTS

| CN | 102880949 A | 1/2013 |
| WO | 2012100433 A1 | 8/2012 |
| WO | 2012129166 A1 | 9/2012 |

OTHER PUBLICATIONS

Kupper, et al., Geofencing and Background Tracking—The Next Features in LBS, Proceedings of the 41th Annual Conference of the Gesellschaft für Informatik eV. 2011, https://www.user.tu-berlin.de/komm/CD/paper/010221.pdf, retrieved Mar. 31, 2022 (Year: 2011).*

(Continued)

*Primary Examiner* — George Chen
(74) *Attorney, Agent, or Firm* — Brooks Kushman P.C.

(57) ABSTRACT

A method and device for determining mail path information, a method and system for sorting mail at a collector-distributor point, and a method and system for labeling delivery information of a collector-distributor point are disclosed. The method for determining mail path information includes determining a latitude-longitude coordinate range of each collector-distributor point according to the collection and distribution region of the collector-distributor point, acquiring the latitude-longitude coordinates of the sending point the destination point; determining the collector-distributor point to which the sending point of the piece of mail is subordinate and the collector-distributor point to which the destination point of the piece of mail is subordinate respectively; acquiring collector-distributor point information of the collector-distributor point to which the sending point is subordinate and the collector-distributor point to which the destination point is subordinate; and determining halfway collector-distributor points and the path information.

18 Claims, 8 Drawing Sheets

(56) References Cited

U.S. PATENT DOCUMENTS

| | | | | |
|---|---|---|---|---|
| 2002/0172399 | A1* | 11/2002 | Poulin | B07C 3/00 |
| | | | | 382/101 |
| 2003/0140064 | A1* | 7/2003 | Klein | G06F 3/04842 |
| 2010/0274609 | A1* | 10/2010 | Shoemaker | G06Q 10/08 |
| | | | | 705/333 |
| 2011/0148634 | A1* | 6/2011 | Putz | G08B 21/22 |
| | | | | 340/541 |
| 2013/0295970 | A1* | 11/2013 | Sheshadri | G01S 19/52 |
| | | | | 455/456.6 |
| 2016/0019500 | A1* | 1/2016 | Hong | G06Q 10/08355 |
| | | | | 705/338 |

OTHER PUBLICATIONS

OIG Blog, "Enhancing Mail Visibility with GPS", USPS Office of Inspector General, https://www.uspsoig.gov/blog/enhancing-mail-visibility-gps, Oct. 29, 2012, retrieved Jun. 23, 2022 (Year: 2012).*
Zhang, Shengrun, Master Dissertation from Beijing Jiaotong University, Research of the Express Network System Based on GIS, Jun. 2009, 81 pages.

* cited by examiner

METHOD AND DEVICE FOR DETERMINING MAIL PATH INFORMATION

CROSS REFERENCE OF RELATED APPLICATION

This application is a continuation of U.S. patent application Ser. No. 14/767,468, filed on Aug. 12, 2015, which is a national stage application of International Application No. PCT/CN2013/074342 filed on Apr. 18, 2013, which claims priority to Chinese Patent Application No. 201310092641.X, filed on Mar. 21, 2013, the disclosures of which are hereby incorporated herein by reference in their entireties.

FIELD

The disclosure relates the field of mail path information, and in particular to a method and device for determining mail path information, a method and system for sorting mail at a collector-distributor point, and a method and system for labeling delivery information of a collector-distributor point.

BACKGROUND

During a conventional mail delivering process, a piece of mail is not delivered from a sending point to a destination point directly. This is because to deliver each of numerous pieces of mail directly, a lot of manpower and resources are required, cost is high and resource consumption is high.

To address this issue, during the conventional mail delivering process, the piece of mail is collected at a collector-distributor point to which the sending point of the mail is subordinate, then after sent to a collector-distributor point to which the destination point of the mail is subordinate from the collector-distributor point to which the sending point of the piece mail is subordinate via halfway collector-distributor points, the piece of mail is delivered to the destination point from the collector-distributor point to which the destination point of the mail is subordinate. The transmission path of the piece of mail is composed of line segments connecting the collector-distributor points that the piece of mail reaches. The transmission path is path information of the piece of mail. During the mail delivering process described above, except the collector-distributor point to which the destination point is subordinate, pieces of mail are divided into multiple sets of pieces of mail at each collector-distributor point based on a next collector-distributor point recorded in the path information of each piece of mail, and in each set of pieces of mail, the pieces of mail are sent to a same next collector.

In a conventional method for determining collector-distributor points recorded in the mail path information, after the piece of mail is sent to the collector-distributor point to which the sending point is subordinate, a next collector-distributor point to which the piece of mail is sent is determined manually at the collector-distributor point where the piece of mail is located currently based on address information of the destination point, until the piece of mail is sent to the collector-distributor point to which the destination point is subordinate. During this process, a lot of manpower is consumed, and it also takes long time to sort the pieces of mail in each collector-distributor point, thereby reducing transmission efficiency of the mail.

SUMMARY

It is an object of the disclosure to provide a method and device for determining mail path information, a method and system for sorting mail at a collector-distributor point, and a method and system for labeling delivery information of a collector-distributor point, for addressing the issue in the conventional art that a next collector-distributor point is determined manually based on address information of a destination point, which consumes human resource and reduces transmission efficiency of mail.

To address the above technical issues, it is provided a method for determining mail path information according to the disclosure, and in the method, a latitude-longitude coordinate range of each collector-distributor point is determined based on a collection and distribution range of the collector-distributor point.

The method includes:

acquiring a latitude-longitude coordinate of a sending point of a piece of mail, and determining, based on the latitude-longitude coordinate range to which the latitude-longitude coordinate of the sending point belongs, a collector-distributor point to which the sending point of the mail is subordinate; and acquiring a latitude-longitude coordinate of a destination point of the piece of mail, and determining, based on a latitude-longitude coordinate range to which the latitude-longitude coordinate of the destination point belongs, a collector-distributor point to which the destination point of the mail is subordinate;

acquiring collector-distributor point information of the collector-distributor point to which the sending point is subordinate and collector-distributor point information of the collector-distributor point to which the destination point is subordinate, where the collector-distributor point information of the collector-distributor point to which the sending point is subordinate records the level of the collector-distributor point to which the sending point is subordinate and collector-distributor points in each level which are superordinate to the collector-distributor point to which the sending point is subordinate, and the collector-distributor point information of the collector-distributor point to which the destination point is subordinate records the level of the collector-distributor point to which the destination point is subordinate and collector-distributor points in each level which are superordinate to the collector-distributor point to which the destination point is subordinate; and determining, based on the collector-distributor point information of the collector-distributor point to which the sending point is subordinate and the collector-distributor point information of the collector-distributor point to which the destination point is subordinate, each halfway collector-distributor point that the piece of mail needs to reach and path information of the piece of mail.

Preferably, the process of determining, based on the collector-distributor point information of the collector-distributor point to which the sending point is subordinate and the collector-distributor point information of the collector-distributor point to which the destination point is subordinate, each halfway collector-distributor point, that the piece of mail needs to reach and path information of the piece of mail includes:

extracting, from the collector-distributor point information of the collector-distributor point to which the sending point is subordinate, collector-distributor points in each level which are superordinate to the collector-distributor point to which the sending point is subordinate as initial sending-side halfway collector-distributor points; and extracting, from the collector-distributor point information of the collector-distributor point to which the destination point is subordinate, collector-distributor points in each level which are superordinate to the collector-distributor point to which the destination point is subordinate as initial destination-side halfway collector-distributor points;

determining, from the initial sending-side halfway collector-distributor points, a collector-distributor point with a highest level as a current sending-side halfway collector-distributor point; and determining, from the initial destination-side halfway collector-distributor points, a collector-distributor point with a highest level as a current destination-side halfway collector-distributor point;

judging whether the current sending-side halfway collector-distributor point is the current destination-side halfway collector-distributor point;

in case of a positive judgment, removing the current sending-side halfway collector-distributor point from the initial sending-side halfway collector-distributor points; removing the current destination-side halfway collector-distributor point from the initial destination-side halfway collector-distributor points; and returning to the process of determining, from the initial sending-side halfway collector-distributor points, a collector-distributor point with a highest level as a current sending-side halfway collector-distributor point; and determining, from the initial destination-side halfway collector-distributor points, a collector-distributor point with a highest level as a current destination-side halfway collector-distributor point;

in case of a negative judgment, determining the remaining initial sending-side halfway collector-distributor points as target sending-side halfway collector-distributor points; and determining the remaining initial destination-side halfway collector-distributor points as target destination-side halfway collector-distributor points;

determining the target sending-side halfway collector-distributor points and the target destination-side halfway collector-distributor points as the halfway collector-distributor points that the piece of mail needs to reach; and connecting the collector-distributor point to which the sending point is subordinate, the halfway collector-distributor points, and the collector-distributor point to which the destination point is subordinate in an order of the collection-distribution path, to form the path information of the piece of mail, where the order of the collection-distribution path is: the collector-distributor point to which the sending point is subordinate, the target sending-side halfway collector-distributor points in an ascending order of the level, the target destination-side halfway collector-distributor points in a descending order of the level, and the collector-distributor point to which the destination point is subordinate.

Preferably, the process of acquiring a latitude-longitude coordinate of a sending point of a piece of mail includes:

acquiring address information of the sending point of the piece of mail; and invoking a geographic information system (GIS) map to find the latitude-longitude coordinate of the sending point based on the address information of the sending point; or acquiring a first latitude-longitude coordinate by a positioning device of a satellite positioning system at the sending point of the piece of mail; and using the first latitude-longitude coordinate as the latitude-longitude coordinate of the sending point;

and accordingly the process of acquiring a latitude-longitude coordinate of a destination point of the piece of mail includes:

acquiring address information of the destination point of the piece of mail; and invoking a geographic information system (GIS) map to find the latitude-longitude coordinate of the destination point based on the address information of the destination point; or acquiring a second latitude-longitude coordinate by a positioning device of a satellite positioning system at the destination point of the piece of mail; and using the second latitude-longitude coordinate as the latitude-longitude coordinate of the destination point.

It is further provided a method for sorting mail at a collector-distributor point according to the disclosure. The method includes acquiring path information of each piece of mail determined in advance by using any one of the methods described above; and for the piece of mail, using the collector-distributor point to which the sending point is subordinate and the halfway collector-distributor points recorded in the path information as current sorting collector-distributor points, establishing, for each current sorting collector-distributor point, a correspondence between the piece of mail and a target collector-distributor point corresponding to the piece of mail at the current sorting collector-distributor point as a sorting correspondence, where the target collector-distributor point of the piece of mail at the current sorting collector-distributor point is a next collector-distributor point to the current sorting collector-distributor point recorded in the path information of the piece of mail at the current sorting collector-distributor point.

At any one of the current sorting collector-distributor points, the method sorting mail at a collector-distributor point includes:

using the pieces of mail at the current sorting collector-distributor point as current sorting pieces of mail, and acquiring sorting correspondences of the current sorting pieces of mail at the current sorting collector-distributor point;

determining target collector-distributor points of the current sorting pieces of mail based on the sorting correspondences of the current sorting pieces of mail; and sorting the current sorting pieces of mail with different target collector-distributor point into different mail sorting sets in accordance with a sorting rule, where the current sorting pieces of mail in the same mail sorting set has a same target collector-distributor point.

It is further provided a method for labeling delivery information of a collector-distributor point according the disclosure. The method includes: acquiring path information of a piece of mail determined in advance by using any one of the methods described above; and using the collector-distributor point to which the destination point is subordinate recorded in the path information of the piece of mail as a current delivering collector-distributor point.

The method includes, at the current delivering collector-distributor point:

labeling the latitude-longitude coordinate of the destination point of the piece of mail in the latitude-longitude coordinate range of the current delivering collector-distributor point on the GIS map.

It is further provided a device for determining mail path information according to the disclosure. The device includes a collector-distributor point coordinate range module configured to determine a latitude-longitude coordinate range of each collector-distributor point based on a collection and distribution range of the collector-distributor point;

a sending point coordinate acquiring module configured to acquire a latitude-longitude coordinate of a sending point of a piece of mail;

a module for determining a collector-distributor point to which a sending point is subordinate configured to determine, based on the latitude-longitude coordinate range to which the latitude-longitude coordinate of the sending point belongs, a collector-distributor point to which the sending point of the mail is subordinate;

a destination point coordinate acquiring module configured to acquire a latitude-longitude coordinate of a destination point of the piece of mail;

a module for determining a collector-distributor pint to which a destination point is subordinate configured to determine, based on the latitude-longitude coordinate range to which the latitude-longitude coordinate of the destination point belongs, a collector-distributor point to which the destination point of the piece of mail is subordinate;

a collector-distributor point information acquiring module configured to acquire collector-distributor point information of the collector-distributor point to which the sending point is subordinate and collector-distributor point information of the collector-distributor point to which the destination point is subordinate, where the collector-distributor point information of the collector-distributor point to which the sending point is subordinate records the level of the collector-distributor point to which the sending point is subordinate, and collector-distributor points in each level which are superordinate to the collector-distributor point to which the sending point is subordinate, and the collector-distributor point information of the collector-distributor point to which the destination point is subordinate records the level of the collector-distributor point to which the destination point is subordinate, and collector-distributor points in each level which are superordinate to the collector-distributor point to which the destination point is subordinate; and a path information determining module configured to determine, based on the collector-distributor point information of the collector-distributor point to which the sending point is subordinate and the collector-distributor point information of the collector-distributor point to which the destination point is subordinate, each halfway collector-distributor point that the piece of mail needs to reach, and path information of the piece of mail.

Optionally, the path information determining module comprises:

an initial sending halfway point extracting sub-module configured to extract, from the collector-distributor point information of the collector-distributor point to which the sending point is subordinate, collector-distributor points in each level which are superordinate to the collector-distributor point to which the sending point is subordinate as initial sending-side halfway collector-distributor points;

an initial destination halfway point extracting sub-module configured to extract, from the collector-distributor point information of the collector-distributor point to which the destination point is subordinate, collector-distributor points in each level which are superordinate to the collector-distributor point to which the destination point is subordinate as initial destination-side halfway collector-distributor points;

a current halfway point determining sub-module configured to determine, from the initial sending-side halfway collector-distributor points, a collector-distributor point with a highest level as a current sending-side halfway collector-distributor point; and determine, from the initial destination-side halfway collector-distributor points, a collector-distributor point with a highest level as a current destination-side halfway collector-distributor point;

a current halfway point judging sub-module configured to judge whether the current sending-side halfway collector-distributor point is the current destination-side halfway collector-distributor point;

an initial halfway point removing sub-module configured to, in case of a positive judgment by the current halfway point judging sub-module, remove the current sending-side halfway collector-distributor point from the initial sending-side halfway collector-distributor points; remove the current destination-side halfway collector-distributor point from the initial destination-side halfway collector-distributor points; and start the current halfway point determining sub-module;

a target halfway point determining sub-module configured to, in case of a negative judgment by the current halfway point judging sub-module, determine the remaining initial sending-side halfway collector-distributor points as target sending-side halfway collector-distributor points; and determine the remaining initial destination-side halfway collector-distributor points as target destination-side halfway collector-distributor points; a halfway collector-distributor point determining sub-module configured to determine the target sending-side halfway collector-distributor points and the target destination-side halfway collector-distributor points as the halfway collector-distributor points that the piece of mail needs to reach; and a mail path connecting sub-module configured to connect the collector-distributor point to which the sending point is subordinate, the halfway collector-distributor points, and the collector-distributor point to which the destination point is subordinate in an order of the collection-distribution path, to form the path information of the piece of mail, where the order of the collection-distribution path is: the collector-distributor point to which the sending point is subordinate, the target sending-side halfway collector-distributor points in an ascending order of the level, the target destination-side halfway collector-distributor points in a descending order of the level, and the collector-distributor point to which the destination point is subordinate.

Optionally, the sending point coordinate acquiring module includes:

a sending address acquiring sub-module configured to acquire address information of the sending point of the piece of mail; and a sending coordinate finding sub-module configured to find the latitude-longitude coordinate of the sending point on a GIS map based on the address information of the sending point; or a sending coordinate positioning sub-module configured to acquire a first latitude-longitude coordinate by a positioning device of a satellite positioning system at the sending point of the mail; and a sending coordinate determining sub-module configured to use the first latitude-longitude coordinate as the latitude-longitude coordinate of the sending point;

and the destination point coordinate acquiring module includes:

a destination address acquiring sub-module configured to acquire address information of the destination point of the piece of mail; and a destination coordinate finding sub-module configured to find the latitude-longitude coordinate of the destination point on the GIS map based on the address information of the destination point; or a destination coordinate positioning sub-module configured to acquire a second latitude-longitude coordinate by a positioning device of a satellite positioning system at the destination point of the piece of mail; and a destination coordinate determining sub-module configured to use the second latitude-longitude coordinate as the latitude-longitude coordinate of the destination point.

It is further provided a system for sorting mail at a collector-distributor point according to the disclosure. The system includes:

a path information acquiring unit configured to acquire path information of a piece mail determined in advance by using any one of the devices described above;

a sorting correspondence establishing unit configured to, using the collector-distributor point to which the sending point is subordinate and the halfway collector-distributor points recorded in the path information for each piece of mail as current sorting collector-distributor points, establish, for each current sorting collector-distributor point, a correspondence between the piece of mail and a target collector-distributor point corresponding to the piece of mail at the current sorting collector-distributor point as a sorting correspondence, where the target collector-distributor point of the piece of mail at the current sorting collector-distributor point is a next collector-distributor point to the current sorting collector-distributor point recorded in the path information of the piece of mail at the current sorting collector-distributor point;

a sorting correspondence acquiring unit configured to, at any one of the current sorting collector-distributor points, use the pieces of mail at the current sorting collector-distributor point as current sorting pieces of mail, and acquire the sorting correspondences of the current sorting pieces of mail at the current sorting collector-distributor point;

a target collector-distributor point determining unit configured to use the pieces of mail at the current sorting collector-distributor point as current sorting pieces of mail, and determine target collector-distributor points of the current sorting pieces of mail based on the sorting correspondences of the current sorting pieces of mail; and a sorting unit configured to sort the current sorting pieces of mail with different target collector-distributor points into different mail sorting sets in accordance with a sorting rule, where the current sorting pieces of mail in the same mail sorting set has a same target collector-distributor point.

It is further provided a system for labeling delivery information of a collector-distributor point in the disclosure. The system includes:

a path information acquiring unit configured to acquire path information of a piece of mail determined in advance by using the device according to any one of the device described above; and use the collector-distributor point to which the destination point is subordinate recorded in the path information of the piece of mail as a current delivering collector-distributor point; and a destination point labeling unit configured to label the latitude-longitude coordinate of the destination point of the piece of mail within the latitude-longitude coordinate range of the current delivering collector-distributor point on the GIS map.

As compared with the conventional art, the disclosure has the following advantages.

In the technical solutions of the disclosure, the latitude-longitude coordinate range of each collector-distributor point is determined for the collection and distribution region of the collector-distributor. In this way, the collector-distributor point to which the sending point of the piece of mail is subordinate and the collector-distributor point to which the destination point of the piece of mail is subordinate are determined respectively based on the acquired latitude-longitude coordinate of the sending point and the acquired latitude-longitude coordinate of the destination point. Based on collector-distributor points in each level which are superordinate to the collector-distributor point to which the sending point is subordinate and collector-distributor points in each level which are superordinate to the collector-distributor point to which the destination point is subordinate recorded in the collector-distributor point information, each halfway collector-distributor point that the piece mail needs to reach, and path information of the piece of mail may be determined, where the path information is formed by connecting the collector-distributor point to which the sending point is subordinate, the halfway collector-distributor points, and the collector-distributor point to which the destination point is subordinate. With the technical solutions of the disclosure, since the sending point, the destination point and the collection and distribution regions of the collector-distributor points are represented by the latitude-longitude coordinates, the collector-distributor point to which the sending point is subordinate and the collector-distributor point to which the destination point is subordinate may be determined when the piece of mail is collected, and thus the path information of the piece of mail may be determined based on the information of the collector-distributor points, thereby avoiding manual determination of a next collector-distributor point on the path of the piece of mail at each collector-distributor point, reducing human resource, reducing the time for sorting the mail, and improving the transmission efficiency of the mail.

BRIEF DESCRIPTION OF THE DRAWINGS

To illustrate technical solutions according to embodiments of the disclosure or in the conventional technology more clearly, the following briefly describes the drawings according to embodiments of the disclosure. Apparently, the drawings are only some embodiments of the present disclosure, and other drawings may be obtained by those skilled in the art according to those drawings without creative efforts.

DETAILED DESCRIPTION

Figure 1:
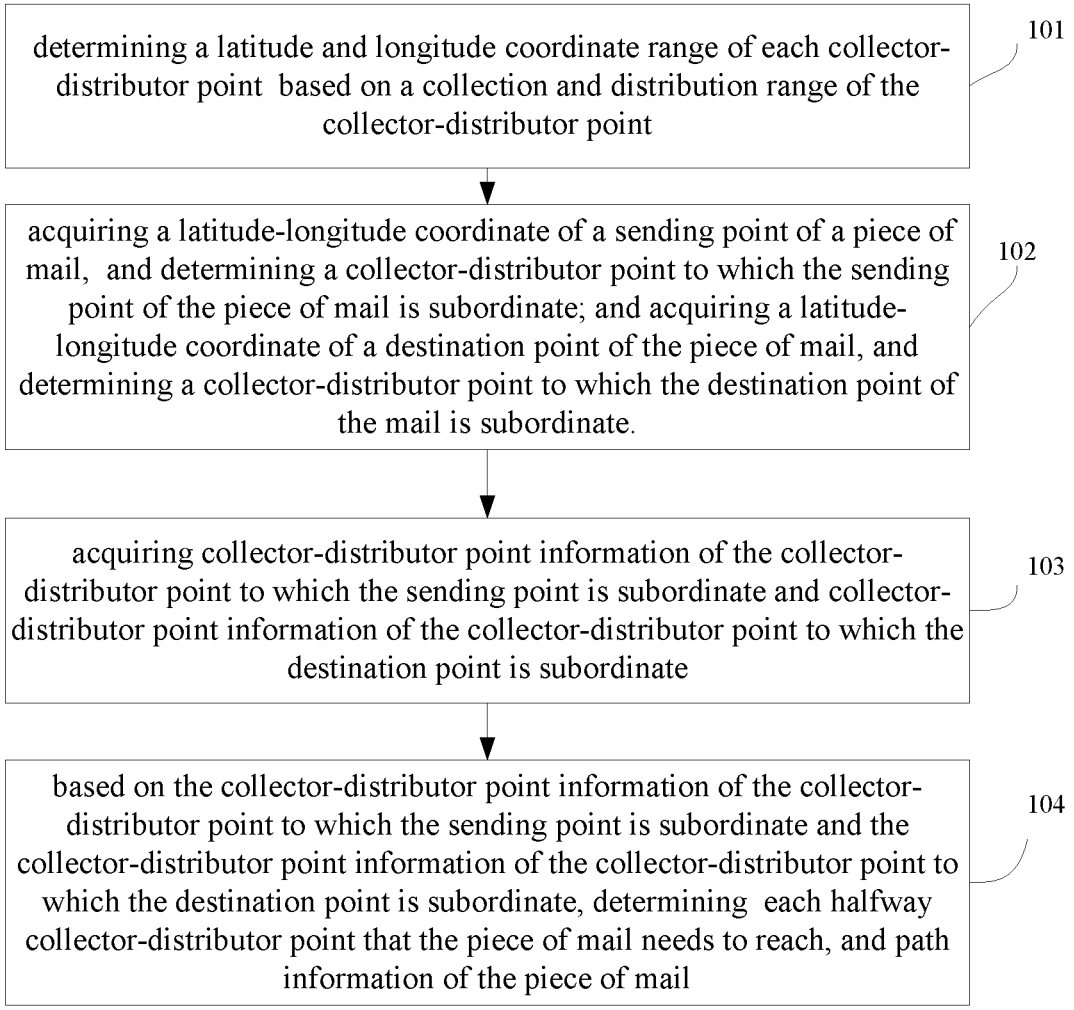
FIG. 1 is a basic flow chart of a first embodiment of a method for determining mail path information according to the disclosure.

To make those skilled in the art better understand the technical solutions of the disclosure, the technical solutions of the embodiments of the present disclosure will be illustrated completely and clearly in combination with the following drawings of the embodiments of the disclosure. Apparently, the described embodiments are merely a few rather than all of the embodiments of the present disclosure. All other embodiments obtained by persons of ordinary skill in the art based on the embodiment of the present disclosure without creative efforts shall fall within the protection scope of the present disclosure.

The disclosure is applicable to various general-purpose or special-purpose environments or configurations for computer systems, such as a personal computer, a server computer, a handhold device or a portable device, a tablet device, a multi-processor system, a microprocessor-based system, a set top box, a programmable consumer electronic device, a network PC, a small computer, a large computer, or a distributed computing environment including any of the above systems or devices, etc.

The disclosure may be described in a general context of computer executable instructions executed by a computer, such as a program module. Generally, the program module includes a routine, a program, an object, a component, a data structure and the like for performing a specific task or implementing a specific abstract data type. The disclosure may also be implemented in a distributed computing environment in which tasks are performed by remote processing devices connected via a communication network. In the distributed computing environment, the program module may be located in a local or remote computer storage medium including a storage device.

The inventor find, through researches, that in the conventional technology, a sending point and a destination point of a piece of mail is represented by address information and zip code. However, the address information of the destination point provided by the sender of the mail is always too obscure or old, and it is difficult to determine the collector-distributor points that the piece of mail needs to reach, directly based on the address information of the sending point of the piece of mail and the address information of the destination point of the piece of mail. For example, the address information of the destination point provided by the sender of the piece of mail is "Zhongzhou branch, Shanghai", and in a case that the piece of mail is located at a collector-distributor point corresponding to Shanghai, a next collector-distributor point that the piece of mail reaches should be a collector-distributor point corresponding to an administrative district. However, since the address information of the destination point does not define the administrative district where the destination point is located, the next collector-distributor point to the Shanghai collector-distributor point on the path of the piece of mail can not be determined directly based on the address information of the destination point. In this case, the next collector-distributor point of the piece of mail may only be determined manually by experience, so as to sort the mail at the Shanghai collector-distributor point.

Based on the above discovery of the inventor, the core idea of the disclosure is as follows. The region of the collection and distribution range of each collector-distributor point is represented in a form of a latitude-longitude coordinate range. When collecting the piece of mail, the latitude-longitude coordinate of the sending point and the latitude-longitude of the destination point of the piece of mail are acquired. The collector-distributor point to which the sending point is subordinate and the collector-distributor point to which the destination point is subordinate are acquired based on the latitude-longitude coordinates. Based on the level of the collector-distributor point to which the sending point is subordinate and a level of the collector-distributor point to which the destination point is subordinate and collector-distributor points in each level which are superordinate to collector-distributor point to which the sending point is subordinate, and collector-distributor points in each level which are superordinate to collector-distributor point to which the destination point is subordinate recorded in the collector-distributor point information of the two collector-distributor points, halfway collector-distributor points between the collector-distributor point to which the sending point is subordinate and the collector-distributor point to which the destination point is subordinate and the mail path information formed by connecting these collector-distributor points are determined. With the above process, when collecting the piece of mail, the path information of the piece of mail can be determined directly based on the latitude-longitude coordinate of the sending point and the latitude-longitude coordinate of the destination point. Thus, when the piece of mail reaches a collector-distributor point, a next collector-distributor point of the mail may be determined directly based on the path information of the piece of mail without any experience, thereby avoiding human participation, reducing human cost, speeding up the sorting of the mail, and improving the transmission efficiency of the mail.

Hereinafter, in conjunction with the drawings, the method and device for determining mail path information, the method and system for sorting mail at a collector-distributor point, and the method and system for labeling delivery information of a collector-distributor point are described in detail according to embodiments of the disclosure.

FIG. 1 shows a basic flow chart of a first embodiment of a method for determining mail path information according to the disclosure. The method according to the embodiment may include following steps S101 to S104.

In step S101, a latitude and longitude coordinate range of each collector-distributor point is determined based on a collection and distribution range of the collector-distributor point.

The collection and distribution region corresponding to each collector-distributor point is the region for collecting and distributing the mail corresponding to this collector-distributor point. The collection and distribution regions for the collector-distributor points in the conventional postal system may be directly used as the collection and distribution region. The latitude-longitude coordinate range of the collection and distribution region is depicted, and is used as the latitude-longitude coordinate range of the collector-distributor point. In depicting the latitude-longitude coordinates, the latitude-longitude coordinates corresponding to different regions may be directly used as the latitude-longitude coordinate ranges corresponding to the collector-distributor points on the geographic information system (GIS) map.

It should be noted that, the latitude-longitude ranges of the collector-distributor points do not overlap with each other, and the latitude-longitude ranges of all the collector-distributor points form the coverage of the postal system.

It can be understood that, step S101 is a step executed in advance. After step S101 is executed in the initialization of the system, each collector-distributor point has a corresponding latitude-longitude coordinate range. Therefore after step S101 is executed, every time the path information of the mail is determined, the method may starts from step S102 without repeating step S101.

In step S102, a latitude-longitude coordinate of a sending point of a piece of mail is acquired, and based on the latitude-longitude coordinate range to which the latitude-longitude coordinate of the sending point belongs, a collector-distributor point to which the sending point of the piece of mail is subordinate is determined; and a latitude-longitude coordinate of a destination point of the piece of mail is acquired, and based on a latitude-longitude coordinate range to which the latitude-longitude coordinate of the destination point belongs, a collector-distributor point to which the destination point of the mail is subordinate is determined.

Since the latitude-longitude coordinate range of each collector-distributor point is determined in advance, when collecting the piece of mail, only by determining the latitude-longitude coordinate range to which the latitude-longitude coordinate of the sending point belongs and the latitude-longitude coordinate range to which the destination point belongs, the collection and distribution region of the collector-distributor point to which the sending point is subordinate and the collection and distribution region of the collector-distributor point to which the destination point is subordinate can be determined. That is, the collector-distributor point to which the sending point is subordinate and the collector-distributor point to which the destination point is subordinate can be determined. The collector-distributor point to which the sending point is subordinate is a first collector-distributor point that the piece of mail reaches after the piece of mail is collected at the sending point, and the collector-distributor point to which the destination point is subordinate is the last collector-distributor point that the piece of mail reaches before the mail is delivered to the destination point.

Furthermore, if the latitude-longitude coordinate of the sending point or the latitude-longitude coordinate of the destination point does not belong to any one of latitude-longitude coordinate ranges of collector-distributor points, the collector-distributor point nearest to the sending point or the destination point may be selected as the collector-distributor point to which the sending point or destination point is subordinate.

It should be noted that, in this embodiment, the latitude-longitude coordinate of the sending point and the latitude-longitude coordinate of the destination point may be acquired in various ways.

The latitude-longitude coordinate of the sending point may be acquired by: acquiring address information of the sending point of the piece of mail; and invoking a geographic information system (GIS) map to find the latitude-longitude coordinate of the sending point based on the address information of the sending point. The latitude-longitude coordinate of the sending point may also be acquired by: acquiring a first latitude-longitude coordinate by a positioning device of a satellite positioning system (such as the GPS of USA, the GLONASS of Russia, the GALILEO of EU or the BDS of China) at the sending point of the piece of mail; and using the first latitude-longitude coordinate as the latitude-longitude coordinate of the sending point. Since the sending point is the place where the piece of mail is acquired, the acquisition of the latitude-longitude coordinate of the sending point may be achieved directly by the positioning device (such as a mobile terminal having a software with a function of acquiring a latitude-longitude coordinate of a current position) of the satellite positioning system. In this case, the sender does not need to enter the address information of the sending point. Thus, the latitude-longitude coordinate of the sending point is preferably acquired by using the positioning device of the satellite positioning system.

The latitude-longitude coordinate of the destination point may be acquired by: acquiring address information of the destination point of the piece of mail; and invoking the GIS map to find the latitude-longitude coordinate of the destination point based on the address information of the destination point. The latitude-longitude coordinate of the destination point may also be acquired by: acquiring a second latitude-longitude coordinate by a positioning device of a satellite positioning system at the destination point of the piece of mail; and using the second latitude-longitude coordinate as the latitude-longitude coordinate of the destination point. Since the latitude-longitude coordinate of the destination point can not be directly acquired by using the positioning device at the sending point, the consignee may locate the latitude-longitude coordinate of the destination point by using the positioning device at the destination point, then send the latitude-longitude coordinate of the destination point to the sender, and the sender records the latitude-longitude coordinate of the destination point. Since it is inconvenience for the sender to acquire the latitude-longitude coordinate of the destination point by using the positioning device, in the embodiment, preferably, the latitude-longitude coordinate of the destination point is acquired by invoking the GIS to find the address information.

In step S103, collector-distributor point information of the collector-distributor point to which the sending point is subordinate and collector-distributor point information of the collector-distributor point to which the destination point is subordinate are acquired, where the collector-distributor point information of the collector-distributor point to which the sending point is subordinate records the level of the collector-distributor point to which the sending point is subordinate, and collector-distributor points in each level which are superordinate to the collector-distributor point to which the sending point is subordinate, and the collector-distributor point information of the collector-distributor point to which the destination point is subordinate records the level of the collector-distributor point to which the destination point is subordinate, and collector-distributor points in each level which are superordinate to the collector-distributor point to which the destination point is subordinate.

Each collector-distributor point is configured with the collector-distributor point information in advance. The collector-distributor point information of the collector-distributor point records the level of the collector-distributor point and collector-distributor points, each with a higher level, to which the collector-distributor point is subordinate.

The level of the collector-distributor point refers to the unit of the largest administrative region that a piece of mail goes through in a case that the piece of mail is sent from the collector-distributor point to another collector-distributor point. The higher the unit of the largest administrative region is, the higher the level of the collector-distributor point is. For example, it is assumed that the Hunan provincial collector-distributor is a collector-distributor point where pieces of mail from various regions within Hunan province are collected and sent to other provincial regions, and pieces of mail from other provincial regions are collected and sent to various regions within Hunan province, the unit of the largest administrative region that the piece of mail goes through in a case that the piece of mail is sent from the Hunan provincial collector-distributor point to another provincial collector-distributor point is a provincial level, and thus this collector-distributor point is a provincial-level collector-distributor point. And it is assumed that the Changsha municipal collector-distributor point in Hunan province is a collector-distributor point where pieces of mail from various regions within Changsha city in Hunan province are collected and sent to other municipal regions in Hunan province and pieces of mail from other municipal regions in Hunan province are collected and sent to various regions within Changsha city in Hunan province, the unit of the largest administrative region that the piece of mail goes through in a case that the piece of mail is sent from the Changsha municipal collector-distributor point in Hunan province to another municipal collector-distributor point in Hunan province is a municipal level, and thus this collector-distributor point is a municipal-level collector-distributor point. Since the provincial-level administrative unit is higher than the municipal-level administrative unit, the level of the Hunan provincial collector-distributor point is higher than the level of the Changsha municipal collector-distributor point in Hunan province.

Furthermore, during the transmission of the piece of mail, each collector-distributor point may only send the piece of mail to a parent-level collector-distributor point to which the collect-distributor is subordinate, or a collector-distributor point which is at the same level as the collector-distributor point and is subordinate to the same parent-level collector-distributor point as the collector-distributor point, or a child-level collector-distributor point subordinate to the collector-distributor point. For example, the piece of mail at Changsha municipal collector-distributor point in Hunan province may only be sent to the Hunan provincial collector-distributor point at the parent level; other municipal-level collector-distributor points which are at the same level as the Changsha municipal collector-distributor point and are also subordinate to the Hunan provincial collector-distributor point at the parent level; or a district collector-distributor point in Changsha city. Thus, to determine the halfway collector-distributor points based on the collector-distributor point information of the collector-distributor point to which the sending point is subordinate and the collector-distributor point information of the collector-distributor point to which the destination point is subordinate, it is required that the collector-distributor point information should include collector-distributor points in each higher level, to which the collector-distributor point is subordinate.

In step S104, based on the collector-distributor point information of the collector-distributor point to which the sending point is subordinate and the collector-distributor point information of the collector-distributor point to which the destination point is subordinate, each halfway collector-distributor point that the piece of mail needs to reach, and path information of the piece of mail are determined.

The halfway collector-distributor points are determined from collector-distributor points in each level which are superordinate to the collector-distributor point to which the sending point is subordinate and collector-distributor points in each level which are superordinate to the collector-distributor point to which the destination point is subordinate, which are recorded in the collector-distributor point information. The path information of the piece of mail is formed by connecting the collector-distributor points that the piece of mail reaches according to an order of a collection and distribution path.

Figure 2:
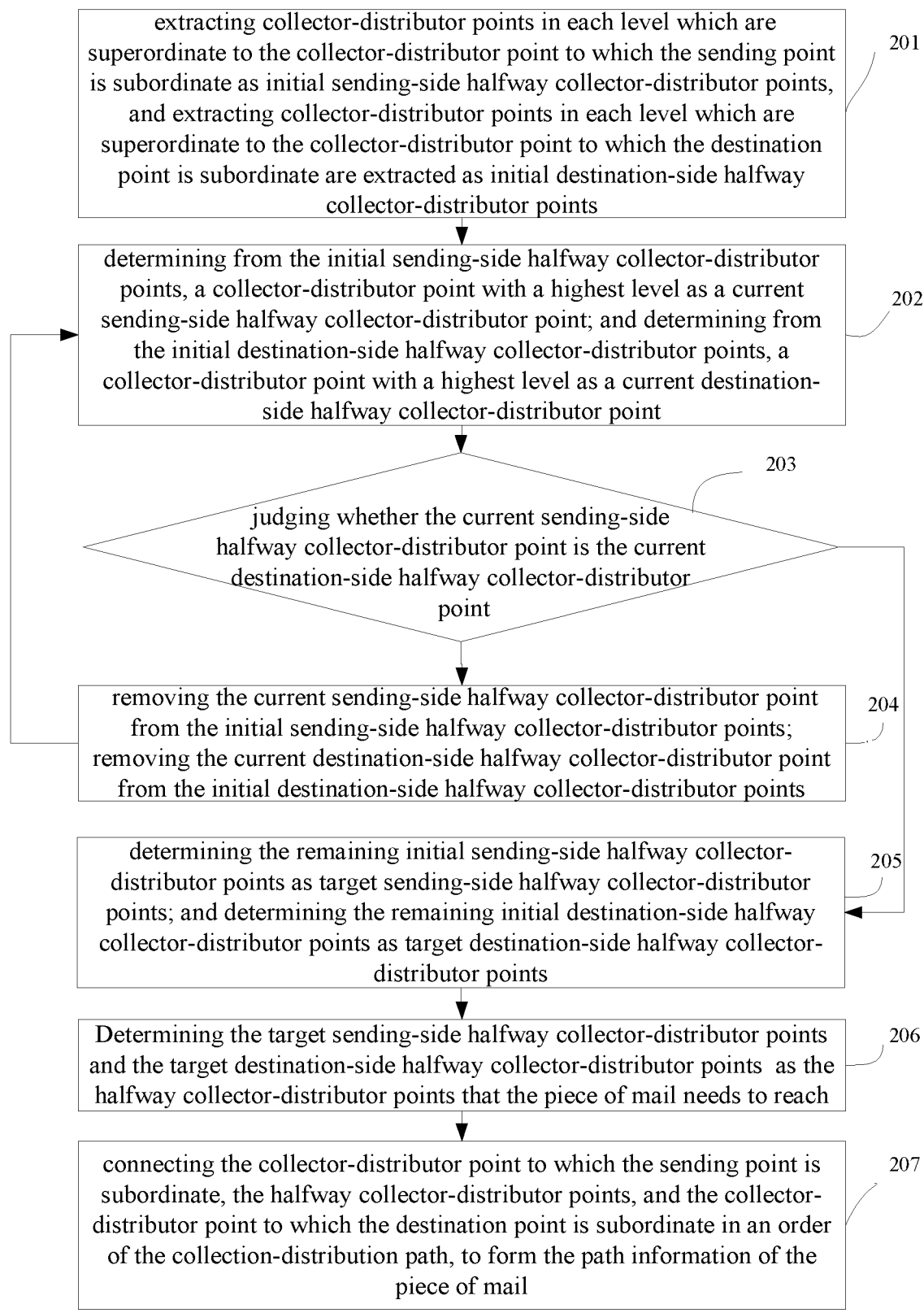
FIG. 2 is a flow chart of a first embodiment of step S104 in the first embodiment of the method according to the disclosure.

FIG. 2 shows a flow chart of a first embodiment of step S104 according to the method embodiment of the disclosure. In this embodiment, step S104 may include following steps S201 to S207.

In step S201, from the collector-distributor point information of the collector-distributor point to which the sending point is subordinate, collector-distributor points in each level which are superordinate to the collector-distributor point to which the sending point is subordinate are extracted as initial sending-side halfway collector-distributor points; and from the collector-distributor point information of the collector-distributor point to which the destination point is subordinate, collector-distributor points in each level which are superordinate to the collector-distributor point to which the destination point is subordinate are extracted as initial destination-side halfway collector-distributor points.

In step S202, from the initial sending-side halfway collector-distributor points, a collector-distributor point with a highest level is determined as a current sending-side halfway collector-distributor point; and from the initial destination-side halfway collector-distributor points, a collector-distributor point with a highest level is determined as a current destination-side halfway collector-distributor point.

In step S203, whether the current sending-side halfway collector-distributor point is the current destination-side halfway collector-distributor point is judged; the method proceeds to step S204 in case of a positive judgment; or lese, the method proceeds to step S205.

In step S204, the current sending-side halfway collector-distributor point is removed from the initial sending-side halfway collector-distributor points; the current destination-side halfway collector-distributor point is removed from the initial destination-side halfway collector-distributor points; and the method returns to step S202.

In step S205, the remaining initial sending-side halfway collector-distributor points are determined as target sending-side halfway collector-distributor points; and the remaining initial destination-side halfway collector-distributor points are determined as target destination-side halfway collector-distributor points.

In step S206, the target sending-side halfway collector-distributor points and the target destination-side halfway collector-distributor points are determined as the halfway collector-distributor points that the piece of mail needs to reach.

In step S207, the collector-distributor point to which the sending point is subordinate, the halfway collector-distributor points, and the collector-distributor point to which the destination point is subordinate are connected in an order of the collection-distribution path, to form the path information of the piece of mail, where the order of the collection-distribution path is: the collector-distributor point to which the sending point is subordinate, the target sending-side halfway collector-distributor points in an ascending order of the level, the target destination-side halfway collector-distributor points in a descending order of the level, and the collector-distributor point to which the destination point is subordinate.

Among the determined halfway collector-distributor points, two halfway collector-distributor points with the highest levels may in some cases send the piece of mail to each other directly, and in other cases send the piece of mail to each other via other collector-distributor point. Therefore, based on a preset correspondence, a path between the collector-distributor point with the highest level among the target sending-side halfway collector-distributor points and the collector-distributor point with the highest level among the target destination-side halfway collector-distributor points can be found, where the path may be a path in which the piece of mail is directly transmitted between the two halfway collector-distributor points with the highest levels, or may be a path in which the piece of mail is forwarded via other collector-distributor point.

The embodiment shown in FIG. 2 will be described in detail by example as follows.

It is assumed that the collector-distributor point to which the sending point is subordinate is a collecting courier A of the Yuelu district collector-distributor point in Changsha city, Hunan province of China, and the collector-distributor point to which the destination point is subordinate is a delivering courier B of the Shushan district collector-distributor point, in Hefei city, Anhui province of China, then the process shown in FIG. 2 includes: extracting initial sending-side halfway collector-distributor points, including a state-level Chinese collector-distributor point, a provincial-level Hunan collector-distributor point in China, a municipal-level Changsha collector-distributor point in Hunan province of China, and the district-level Shushang collector-distributor point in Yuelu, Changsha, Hunan province of China; extracting initial destination-side halfway collector-distributor points, including a state-level Chinese collector-distributor point, a provincial-level Anhui collector-distributor point in China, a municipal-level Hefei collector-distributor point in Anhui province of China, and a district-level Shushan collector-distributor point in Hefei, Anhui province of China; using the Chinese collector-distributor point as the current sending-side halfway collector-distributor point and the current destination-side halfway collector-distributor point; removing the Chinese collector-distributor point from the initial sending-side halfway collector-distributor points and the initial destination-side halfway collector-distributor points since the current sending-side halfway collector-distributor point and the current destination-side halfway collector-distributor point each are the Chinese collector-distributor point; using the Hunan collector-distributor point in China as the current sending-side halfway collector-distributor point, and using the Anhui collector-distributor point in China as the current destination-side halfway collector-distributor point; determining the Hunan collector-distributor point in China, the Changsha collector-distributor point in Hunan province of China and the Qiulu collector-distributor point in Changsha, Hunan province of China, as the target sending-side halfway collector-distributor points, and determining the Anhui collector-distributor point in China, the Hefei collector-distributor point in Anhui province of China and the Shushan collector-distributor point in Hefei, Anhui province of China, as the target destination-side halfway collector-distributor points; determining the Hunan collector-distributor point in China, the Changsha collector-distributor point in Hunan province of China, the Qiulu collector-distributor point in Changsha, Hunan province of China, the Anhui collector-distributor point in China, the Hefei collector-distributor point in Anhui province of China and the Shushan collector-distributor point in Hefei, Anhui province of China, as the halfway collector-distributor points, since the Anhui collector-distributor point in China is different from the Hunan collector-distributor point in China; and determining that the mail path information is: the collecting courier A of the collector-distributor point in Qiulu district of Changsha city, Hunan province of China, the Qiulu collector-distributor point in Changsha, Hunan province of China, the Changsha collector-distributor point in Hunan province of China, the Hunan collector-distributor point in China, the Anhui collector-distributor point in in China, the Hefei collector-distributor point in Anhui province of China, the Shushan collector-distributor point in Hefei, Anhui province of China and the delivering courier B of the collector-distributor point in Shushan, Hefei, Anhui province of China.

Furthermore, in the above embodiment, the mail transmission path between the Anhui collector-distributor point in China and the Hunan collector-distributor point in China may be determined based on preset path information of collector-distributor points at the provincial level. The Anhui collector-distributor point in China and the Hunan collector-distributor point in China may send the piece of mail to each other directly, or may send the piece of mail to each other via other provincial-level collector-distributor point.

As shown in FIG. 1, after step S104, the first embodiment of the method for determining mail path information may be finished.

Figure 13:
FIG. 13 shows two preferable kinds of bar code for recording a mail identifier according to the disclosure.
Figure 13:
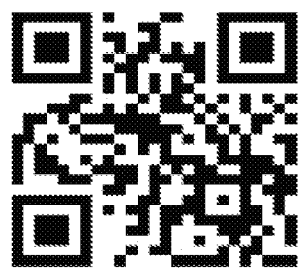

It should be noted that, after step S104, the path information of the piece of mail is determined, in this case, an identifier (which is represented by hexadecimal numbers, such as 886FA7Be9C02) should be configured for the piece of mail. With this identifier, the path information of the piece of mail can be read, and the piece of mail can be identified during establishing sorting correspondence, sorting and delivering the piece of mail. The mail identifier for sorting and delivering may be recorded in a form of a bar code (such as a one-dimensional code, or a two-dimensional code), an electronic tag or RFID. The mail identifier in this embodiment is recorded in the form of the bar code as shown in FIG. 13.

With the technical solutions of this embodiment, based on the latitude-longitude coordinates of the sending point and the destination point of the piece of mail, the path information of the piece of mail and the collector-distributor points that the mail needs to reach may be determined directly. Thus, when the piece of mail reaches a collector-distributor point, a next collector-distributor point of the piece of mail may be determined directly based on the path information of the mail piece without experience, thereby avoiding human participation, reducing human cost, speeding up the sorting of the piece of mail, and improving the transmission efficiency of the mail.

Figure 3:
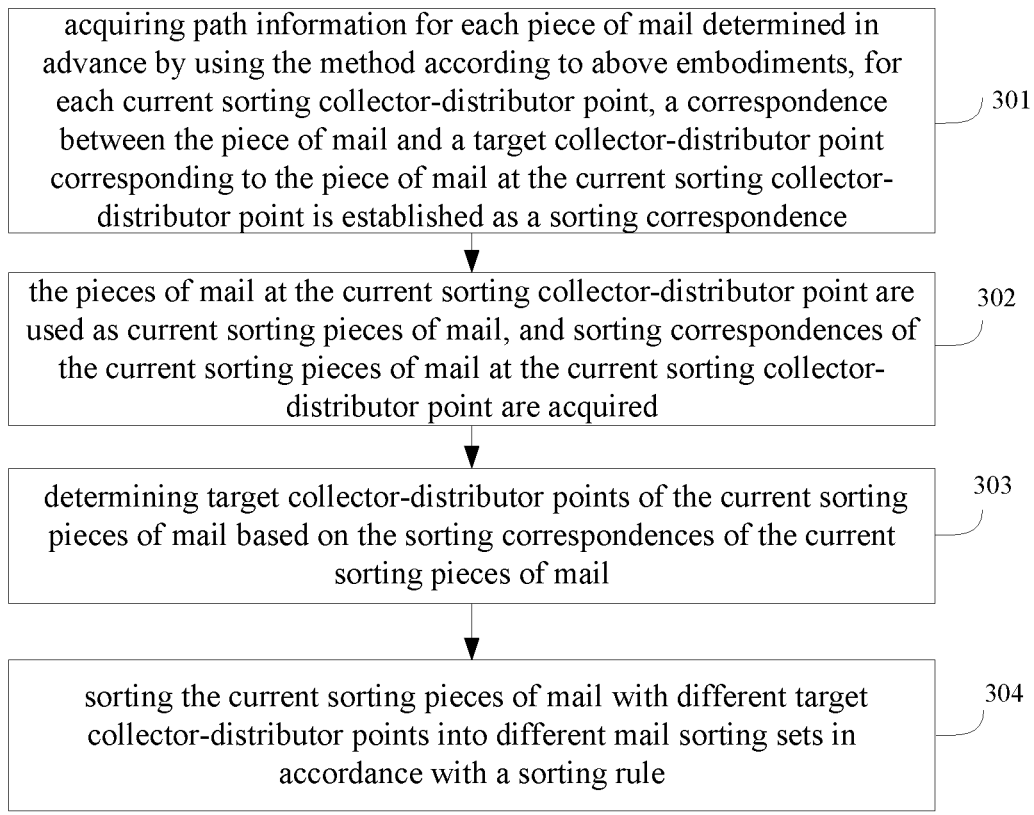
FIG. 3 is a basic flow chart of a first embodiment of a method for sorting mail at a collector-distributor point according to the disclosure.

FIG. 3 shows a basic flow chart of a first embodiment of a method for sorting mail at a collector-distributor point according to the disclosure. The method according to the embodiment may include following steps S301 to S304.

In step S301, path information for each piece of mail determined in advance by using the method according to any one of claims 1 to 3 is acquired; and for the piece of mail, the collector-distributor point to which the sending point is subordinate and the halfway collector-distributor points recorded in the path information are used as current sorting collector-distributor points; for each current sorting collector-distributor point, a correspondence between the piece of mail and a target collector-distributor point corresponding to the piece of mail at the current sorting collector-distributor point is established as a sorting correspondence, where the target collector-distributor point of the piece of mail at the current sorting collector-distributor point is a next collector-distributor point to the current sorting collector-distributor point recorded in the path information of the piece of mail at the current sorting collector-distributor point.

In the sorting correspondences, pieces of mail should be distinguished by using identifiers. Each identifier represents a piece of mail. In this way, the sorting correspondence of the piece of mail may be found based on the identifier of the piece of mail. Furthermore, the piece of mail may be provided with the identifier when the piece of mail is collected.

Furthermore, the target collector-distributor point of the piece of mail at the current sorting collector-distributor point is a next collector-distributor point that the piece of mail is about to reach after the current sorting collector-distributor point on the transmission path of the piece of mail. The collector-distributor points recorded in the path information are recorded in the order of the collection and distribution path, and thus the next collector-distributor point after the current sorting collector-distributor point is the target collector-distributor point.

It should be understood that, step S301 is a step executed in advance. Step S301 is executed for only one time before the pieces of mail are sorted at the current sorting collector-distributor point, without executing step S301 when the pieces of mail are sorted at each collector-distributor point.

After step S301, when the pieces of mail are sorted at any collector-distributor point, step S302 is executed by using the collector-distributor point as the current sorting collector-distributor point.

In step S302, at any one of current sorting collector-distributor points, the pieces of mail at the current sorting collector-distributor point are used as current sorting pieces of mail, and sorting correspondences of the current sorting pieces of mail at the current sorting collector-distributor point are acquired.

In step S303, target collector-distributor points of the current sorting pieces of mail are determined based on the sorting correspondences of the current sorting pieces of mail Since the sorting correspondence of the current sorting collector-distributor records a correspondence between the mail identifier and the target collector-distributor point corresponding to the mail identifier at the current sorting collector-distributor point, the mail identifier (such as the 886FA7Be9C02 recorded in the bar code as shown in FIG. 13) may be acquired from the form (such as the bar code, the electronic tag, or the RFID) for recording the current sorting piece of mail, and then the target collector-distributor point of the piece of mail is determined based on the sorting correspondence.

In step S304, the current sorting pieces of mail with different target collector-distributor points are sorted into different mail sorting sets in accordance with a sorting rule, where the current sorting pieces of mail in the same mail sorting set has a same target collector-distributor point.

With the technical solution of this embodiment, when the pieces of mail are sorted at the collector-distributor point, the next collector-distributor point of each piece of mail may be determined directly based on the path information of the piece of mail, which does not need any experience, thereby avoiding human participation, reducing human cost, speeding up sorting the pieces of mail, and improving the transmission efficiency of the mail.

It should be noted that, the piece of mail, at the collector-distributor point to which the destination point is subordinate, may enter into a delivery process. To facilitate the delivering courier to find the destination point during delivery, the position to which the piece of mail needs to be delivered may be marked on the map for the deliverer before the delivery.

A first embodiment of a method for labeling delivery information of a collector-distributor point according to the disclosure may include step A.

In step A, path information of a piece of mail determined in advance by using the method according to the above embodiment is acquired; and the collector-distributor point to which the destination point is subordinate recorded in the path information of the piece of mail is used as a current delivering collector-distributor point.

It should be understood that, step A is a step executed in advance. For each piece of mail, step A only needs to be executed for one time before the piece of mail is delivered from the current collector-distributor point, without being executed each time a piece of mail is delivered from a current collector-distributor point.

After step A, in a case that a piece of mail is delivered from any collector-distributor point, step B is executed by using this collector-distributor point as a current delivering collector-distributor point.

At the any current delivering collector-distributor point, the method includes step B.

In step B, the latitude-longitude coordinate of the destination point of the piece of mail is labeled within the latitude-longitude coordinate range of the current delivering collector-distributor point on the GIS map.

By labeling the destination point of each piece of mail on the GIS map, a geographic position of a consignee of each piece of mail is clear for the delivering courier, and the delivering courier can arrange the delivering path reasonably based on the destination points of all pieces of mail to be delivered, thereby saving the time for delivery and improving the efficiency of the delivery.

Hereinafter, by taking a specific application scene as an example, the method for delivering a piece of mail by using the technical solution according to the disclosure is described in detail. In this scene, when a piece of mail is collected, the path information of the piece of mail is determined based on the latitude-longitude coordinate of the sending point of the piece of mail and the latitude-longitude coordinate of the destination point of the piece of mail, then the piece of mail is sorted and sent at each collector-distributor point based on the path information of the piece of mail, and finally, the piece of mail is delivered to the consignee. Specifically, the collector-distributor point to which the sending point is subordinate is set as the collecting courier, and the collector-distributor point to which the destination point is subordinate is set as the delivering courier. In this way, for each piece of mail, the collector-distributor point to which the sending point is subordinate and the collector-distributor point to which the destination point is subordinate each only have one parent-level collector-distributor point.

Figure 4:
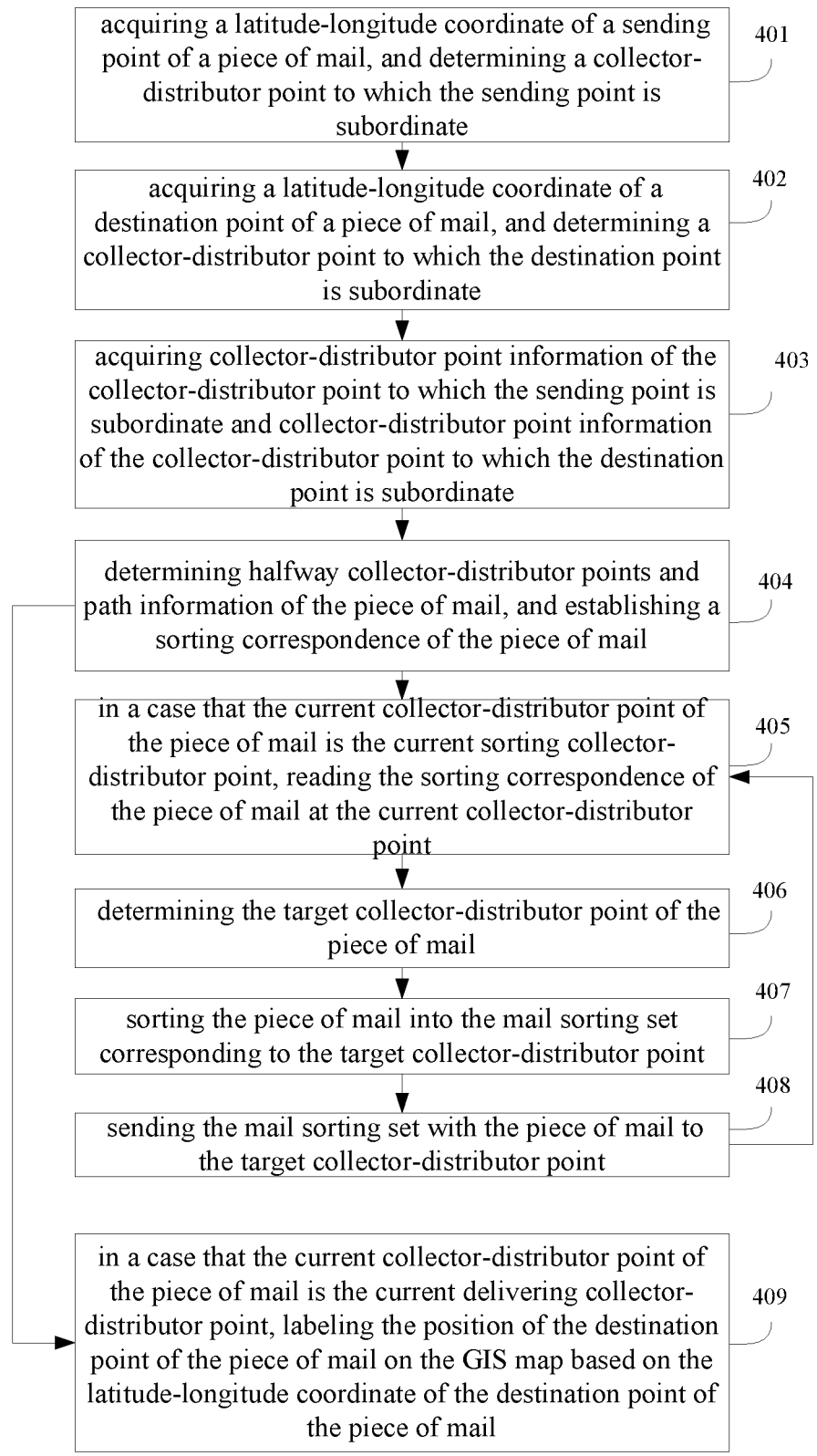
FIG. 4 is a flow chart of a first embodiment of a method for delivering mail according to the disclosure.

FIG. 4 shows a flow chart of a first embodiment of a method for delivering mail according to the disclosure. The method according to the embodiment may include following steps S401 to S409.

In step S401, a latitude-longitude coordinate of a sending point of a piece of mail is acquired, and a collector-distributor point to which the sending point is subordinate is determined.

The latitude-longitude coordinate of the current position where the piece of mail is collected is acquired as the latitude-longitude coordinate of the sending point, by using a positioning device of a satellite positioning system; and a collecting courier corresponding to this sending point is determined based on the latitude-longitude coordinate of the sending point.

In step S402, a latitude-longitude coordinate of a destination point of a piece of mail is acquired, and a collector-distributor point to which the destination point is subordinate is determined.

The latitude-longitude coordinate corresponding to the address information of the destination point provided by the sender, or the latitude-longitude coordinate of the destination point provided by the sender is found on the GIS map; and a delivering courier corresponding to the destination point is determined based on the latitude-longitude coordinate of the destination point.

In step S403, collector-distributor point information of the collector-distributor point to which the sending point is subordinate and collector-distributor point information of the collector-distributor point to which the destination point is subordinate are acquired.

That is, collector-distributor points in each level to which the collecting courier is subordinate, and collector-distributor points in each level to which the delivering courier is subordinate, including the state-level collector-distributor point, the provincial-level collector-distributor point, the municipal-level collector-distributor point and the district-level collector-distributor point, are acquired.

In step S404, halfway collector-distributor points and path information of the piece of mail are determined, and a sorting correspondence of the piece of mail is established.

According to the embodiment as shown in FIG. 2, initial sending-side halfway collector-distributor points and initial destination-side halfway collector-distributor points are extracted from the collector-distributor point information, the target sending-side halfway collector-distributor point and the target destination-side halfway collector-distributor points are determined, and the halfway collector-distributor points and the path information of the piece of mail are determined. The order of the collector-distributor points recorded in the path information is the order of the collection and distribution path.

In the sorting correspondence of the piece of mail, a mail identifier and a target collector-distributor point are recorded. The target collector-distributor point is a next collector-distributor point to the current collector-distributor point recorded in the path information of the piece of mail.

In step S405, in a case that the current collector-distributor point of the piece of mail is the current sorting collector-distributor point, the sorting correspondence of the piece of mail at the current collector-distributor point is read.

In step S406, the target collector-distributor point of the piece of mail is determined.

The target collector-distributor point of the piece of mail is determined based on the target collector-distributor point recorded in the sorting correspondence read in step S405.

In step S407, the piece of mail is sorted into the mail sorting set corresponding to the target collector-distributor point.

In step S408, the mail sorting set with the piece of mail is sent to the target collector-distributor point, and the method returns to step S405.

In step S409, in a case that the current collector-distributor point of the piece of mail is the current delivering collector-distributor point, the position of the destination point of the piece of mail is labeled on the GIS map based on the latitude-longitude coordinate of the destination point of the piece of mail The delivering courier delivers the piece of mail to the consignee based on the position of the destination point labeled on the GIS map.

With the technical solution of this embodiment, when the piece of mail is sorted at the collector-distributor point, the next collector-distributor point of the piece mail may be determined directly based on the path information of the piece of mail without any experience, thereby avoiding human participation, reducing human cost, speeding up the sorting of the mail, and improving the transmission efficiency of the mail.

Corresponding to the method embodiment, it is provided a device for determining mail path information in the disclosure.

Figure 5:
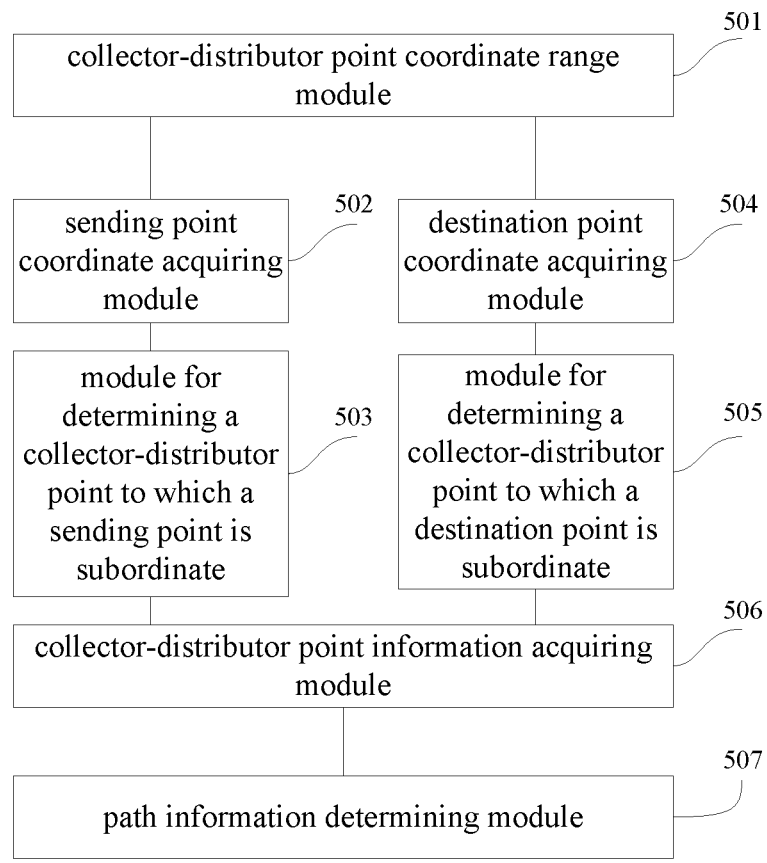
FIG. 5 is a structural diagram of a first embodiment of a device for determining mail path information according to the disclosure.

FIG. 5 shows a structural diagram of a first embodiment of a device for determining mail path information according to the disclosure, the device according to this embodiment includes a collector-distributor point coordinate range module 501, a sending point coordinate acquiring module 502, a module 503 for determining a collector-distributor point to which a sending point is subordinate, a destination point coordinate acquiring module 504, a module 505 for determining a collector-distributor point to which a destination point is subordinate, a collector-distributor point information acquiring module 506, and a path information determining module 507.

The collector-distributor point coordinate range module 501 is configured to determine a latitude-longitude coordinate range of each collector-distributor point based on a collection and distribution range of the collector-distributor point.

The sending point coordinate acquiring module 502 is configured to acquire a latitude-longitude coordinate of a sending point of a piece of mail.

The module 503 for determining a collector-distributor point to which a sending point is subordinate is configured to determine, based on the latitude-longitude coordinate range to which the latitude-longitude coordinate of the sending point belongs, a collector-distributor point to which the sending point of the piece of mail is subordinate.

The destination point coordinate acquiring module 504 is configured to acquire a latitude-longitude coordinate of a destination point of the piece of mail.

The module 505 for determining a collector-distributor point to which a destination point is subordinate 505 is configured to determine, based on the latitude-longitude coordinate range to which the latitude-longitude coordinate of the destination point belongs, a collector-distributor point to which the destination point of the piece of mail is subordinate.

The collector-distributor point information acquiring module 506 is configured to acquire collector-distributor point information of the collector-distributor point to which the sending point is subordinate and collector-distributor point information of the collector-distributor point to which the destination point is subordinate, where the collector-distributor point information of the collector-distributor point to which the sending point is subordinate records the level of the collector-distributor point to which the sending point is subordinate, and collector-distributor points in each level which are superordinate to the collector-distributor point to which the sending point is subordinate, and the collector-distributor point information of the collector-distributor point to which the destination point is subordinate records the level of the collector-distributor point to which the destination point is subordinate, and collector-distributor points in each level which are superordinate to the collector-distributor point to which the destination point is subordinate.

The path information determining module 507 is configured to determine, based on the collector-distributor point information of the collector-distributor point to which the sending point is subordinate and the collector-distributor point information of the collector-distributor point to which the destination point is subordinate, each halfway collector-distributor point that the piece of mail needs to reach, and path information of the piece of mail.

Figure 6:
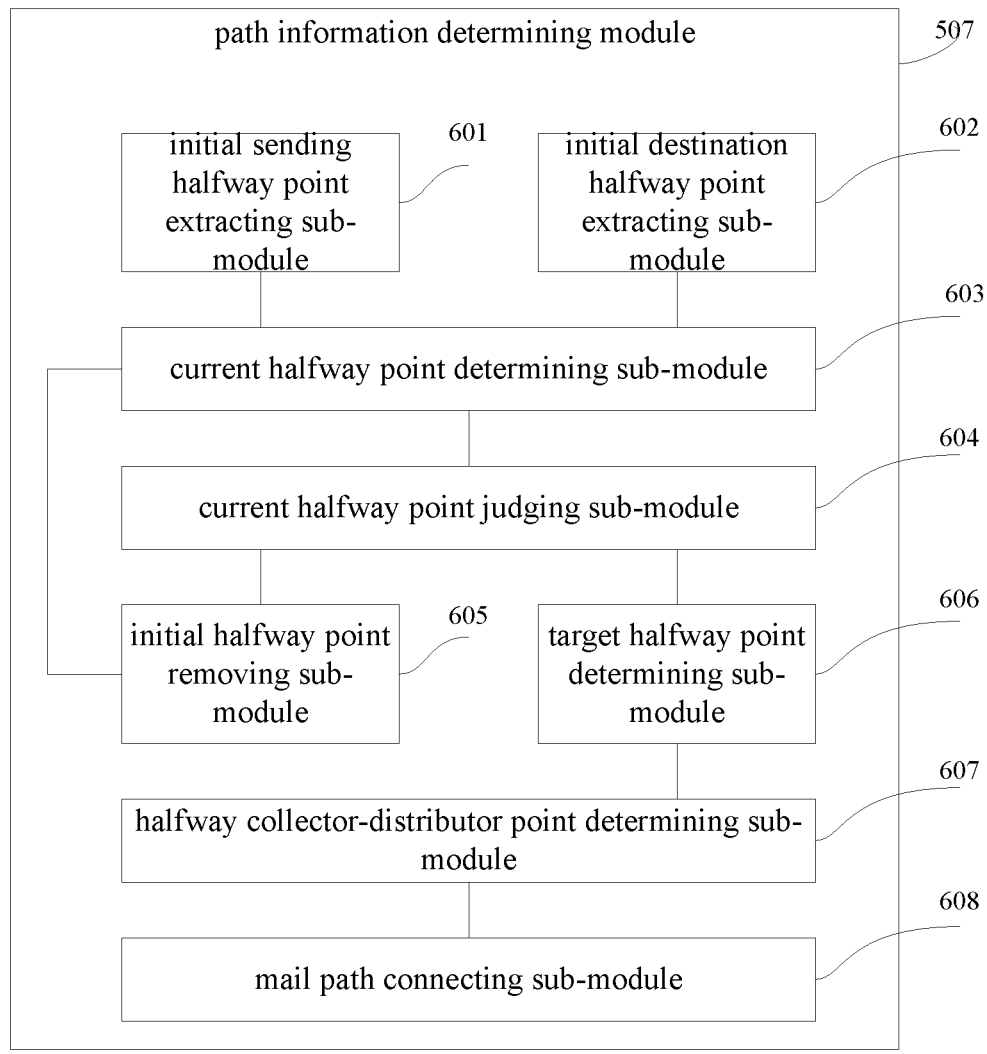
FIG. 6 is a structural diagram of a path information determining module according to the device embodiment of the disclosure.

FIG. 6 shows a structural diagram of a path information determining module according to the first device embodiment of the disclosure, the path information determining module 507 may include an initial sending halfway point extracting sub-module 601, an initial destination halfway point extracting sub-module 602, a current halfway point determining sub-module 603, a current halfway point judging sub-module 604, an initial halfway point removing sub-module 605, a target halfway point determining sub-module 606, a halfway collector-distributor point determining sub-module 607, and a mail path connecting sub-module 608.

The initial sending halfway point extracting sub-module 601 is configured to extract, from the collector-distributor point information of the collector-distributor point to which the sending point is subordinate, collector-distributor points in each level which are superordinate to the collector-distributor point to which the sending point is subordinate as initial sending-side halfway collector-distributor points.

The initial destination halfway point extracting sub-module 602 is configured to extract, from the collector-distributor point information of the collector-distributor point to which the destination point is subordinate, collector-distributor points in each level which are superordinate to the collector-distributor point to which the destination point is subordinate as initial destination-side halfway collector-distributor points.

The current halfway point determining sub-module 603 is configured to determine, from the initial sending-side halfway collector-distributor points, a collector-distributor point with a highest level as a current sending-side halfway collector-distributor point; and determine, from the initial destination-side halfway collector-distributor points, a collector-distributor point with a highest level as a current destination-side halfway collector-distributor point.

The current halfway point judging sub-module 604 is configured to judge whether the current sending-side halfway collector-distributor point is the current destination-side halfway collector-distributor point.

The initial halfway point removing sub-module 605 is configured to, in case of a positive judgment by the current halfway point judging sub-module, remove the current sending-side halfway collector-distributor point from the initial sending-side halfway collector-distributor points; remove the current destination-side halfway collector-distributor point from the initial destination-side halfway collector-distributor points; and start the current halfway point determining sub-module.

The target halfway point determining sub-module 606 is configured to, in case of a negative judgment by the current halfway point judging sub-module, determine the remaining initial sending-side halfway collector-distributor points as target sending-side halfway collector-distributor points; and determine the remaining initial destination-side halfway collector-distributor points as target destination-side halfway collector-distributor points.

The halfway collector-distributor point determining sub-module 607 is configured to determine the target sending-side halfway collector-distributor points and the target destination-side halfway collector-distributor points as the halfway collector-distributor points that the piece of mail needs to reach.

The mail path connecting sub-module 608 is configured to connect the collector-distributor point to which the sending point is subordinate, the halfway collector-distributor points, and the collector-distributor point to which the destination point is subordinate in an order of the collection-distribution path, to form the path information of the piece of mail, where the order of the collection-distribution path is: the collector-distributor point to which the sending point is subordinate, the target sending-side halfway collector-distributor points in an ascending order of the level, the target destination-side halfway collector-distributor points in a descending order of the level, and the collector-distributor point to which the destination point is subordinate.

Figure 7:
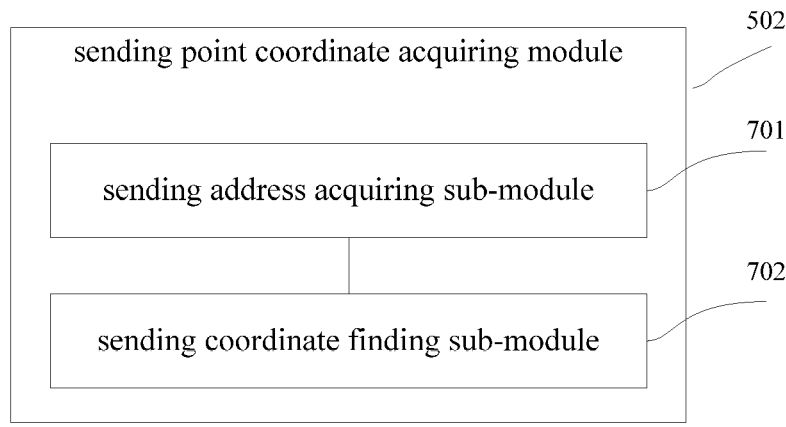
FIG. 7 is a structural diagram of a sending point coordinate acquiring module according to the device embodiment of the disclosure.

FIG. 7 shows a structural diagram of a sending point coordinate acquiring module according to the first device embodiment of the disclosure. The sending point coordinate acquiring module 502 may include a sending address acquiring sub-module 701 and a sending coordinate finding sub-module 702.

The sending address acquiring sub-module 701 is configured to acquire address information of the sending point of the piece of mail.

The sending coordinate finding sub-module 702 is configured to find the latitude-longitude coordinate of the sending point on a GIS map based on the address information of the sending point.

Figure 8:
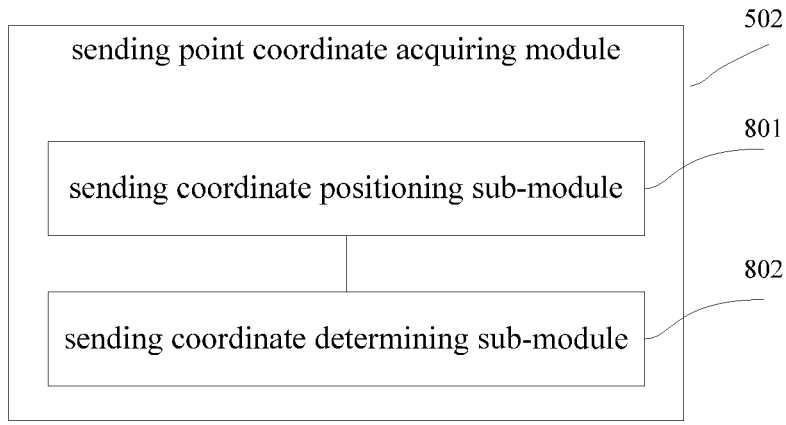
FIG. 8 is another structural diagram of a sending point coordinate acquiring module according to the device embodiment of the disclosure.

FIG. 8 shows another structural diagram of a sending point coordinate acquiring module according to the first device embodiment of the disclosure. The sending point coordinate acquiring module 502 may include a sending coordinate positioning sub-module 801 and a sending coordinate determining sub-module 802.

The sending coordinate positioning sub-module 801 is configured to acquire a first latitude-longitude coordinate by a positioning device of a satellite positioning system at the sending point of the piece of mail.

The sending coordinate determining sub-module 802 is configured to use the first latitude-longitude coordinate as the latitude-longitude coordinate of the sending point.

Figure 9:
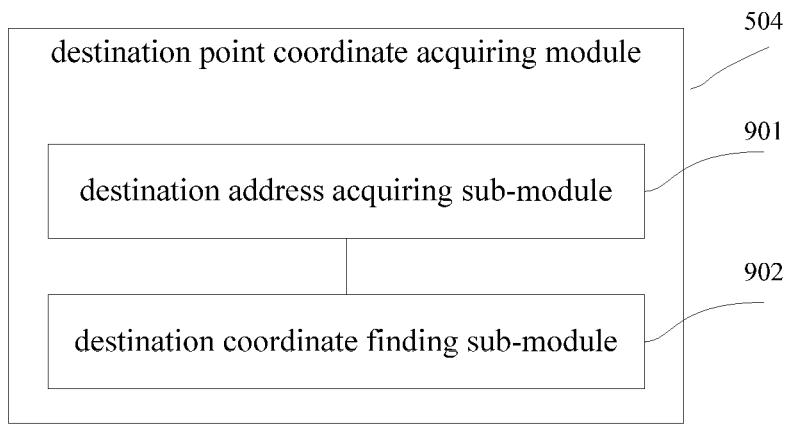
FIG. 9 is a structural diagram of a destination point coordinate acquiring module according to the device embodiment of to the disclosure.

FIG. 9 shows a structural diagram of a destination point coordinate acquiring module according to the first device embodiment of the disclosure. The destination point coordinate acquiring module 504 may include a destination address acquiring sub-module 901 and a destination coordinate finding sub-module 902.

The destination address acquiring sub-module 901 is configured to acquire address information of the destination point of the piece of mail.

The destination coordinate finding sub-module 902 is configured to find the latitude-longitude coordinate of the destination point on the GIS map based on the address information of the destination point.

Figure 10:
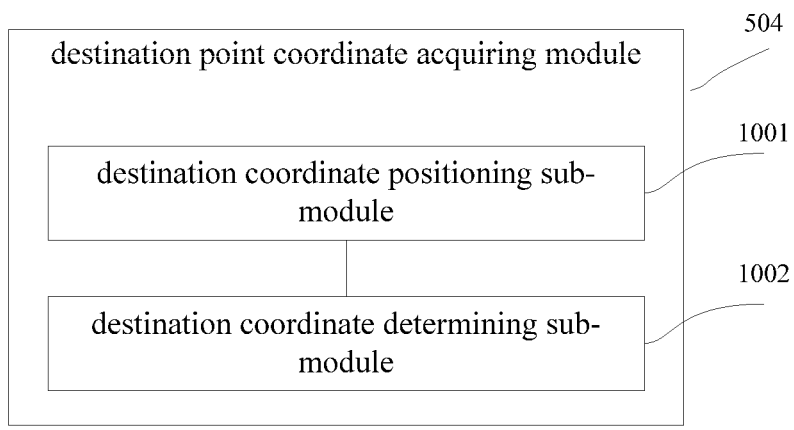
FIG. 10 is another structural diagram of a destination point coordinate acquiring module according to the device embodiment of the disclosure.

FIG. 10 shows another structural diagram of a destination point coordinate acquiring module according to the first device embodiment of the disclosure. The destination point coordinate acquiring module 504 may include a destination coordinate positioning sub-module 1001 and a destination coordinate determining sub-module 1002.

The destination coordinate positioning sub-module 1001 is configured to acquire a second latitude-longitude coordinate by a positioning device of a satellite positioning system at the destination point of the piece of mail.

The destination coordinate determining sub-module 1002 is configured to use the second latitude-longitude coordinate as the latitude-longitude coordinate of the destination point.

With the technical solution of the device embodiment of the disclosure, based on the latitude-longitude coordinate of the sending point and the latitude-longitude coordinate of the destination point of the mail, the path information of the piece of mail and the collector-distributor points that the mail needs to reach may be determined directly. Thus, when the piece of mail is sorted at a collector-distributor point, the next collector-distributor point that the mail is about to reach may be determined directly based on the path information of the piece of mail without any experience, thereby reducing human cost, and improving the transmission efficiency of the mail.

Figure 11:
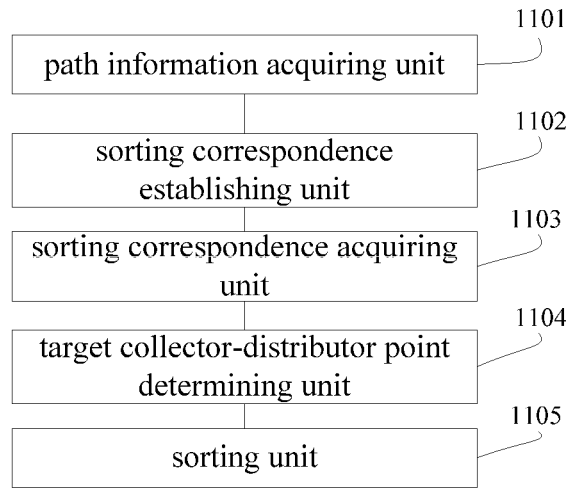
FIG. 11 is a structural diagram of a first embodiment of a system for sorting mail at a collector-distributor point according to the disclosure.

Corresponding to the method embodiments, it is further provided a system for sorting mail at a collector-distributor point in the disclosure. FIG. 11 shows a structural diagram of a first embodiment of a system for sorting mail at a collector-distributor point according to the disclosure. The system according to this embodiment includes a path information acquiring unit 1101, a sorting correspondence establishing unit 1102, a sorting correspondence acquiring unit 1103, a target collector-distributor point determining unit 1104, and a sorting unit 1105.

The path information acquiring unit 1101 is configured to acquire path information of a piece of mail determined in advance by using the device according to any one of the device embodiments.

The sorting correspondence establishing unit 1102 is configured to, use the collector-distributor point to which the sending point is subordinate and the halfway collector-distributor points recorded in the path information for each piece of mail as current sorting collector-distributor points, establish, for each current sorting collector-distributor point, a correspondence between the piece of mail and a target collector-distributor point corresponding to the piece of mail at the current sorting collector-distributor point as a sorting correspondence, where the target collector-distributor point of the piece of mail at the current sorting collector-distributor point is a next collector-distributor point to the current sorting collector-distributor point recorded in the path information of the piece of mail at the current sorting collector-distributor point.

The sorting correspondence acquiring unit 1103 is configured to, at any one of the current sorting collector-distributor points, use the pieces of mail at the current sorting collector-distributor point as current sorting pieces of mail, and acquire the sorting correspondences of the current sorting pieces of mail at the current sorting collector-distributor point.

The target collector-distributor point determining unit 1104 is configured to use the pieces of mail at the current sorting collector-distributor point as current sorting pieces of mail, and determine target collector-distributor points of the current sorting pieces of mail based on the sorting correspondences of the current sorting pieces of mail.

The sorting unit 1105 is configured to sort the current sorting pieces of mail with different target collector-distributor points into different mail sorting sets in accordance with a sorting rule, where the current sorting pieces of mail in the same mail sorting set has a same target collector-distributor point.

Figure 12:
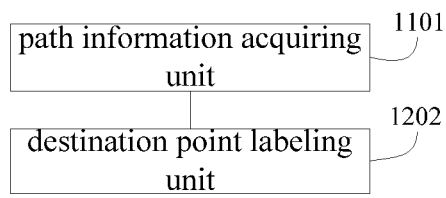
FIG. 12 is a structural diagram of a first embodiment of a system for labeling delivery information of a collector-distributor point according to the disclosure.

Corresponding to the method embodiment, it is further provided a system for labeling delivery information of a collector-distributor point according to the disclosure. FIG. 12 shows a structural diagram of a first embodiment of a system for labeling delivery information of a collector-distributor point according to the disclosure, the system according to this embodiment may include a path information acquiring unit 1101 and a destination point labeling unit 1201.

The path information acquiring unit 1101 is configured to acquire path information of a piece of mail determined in advance by using the device according to any one of the device embodiments; and use the collector-distributor point to which the destination point is subordinate recorded in the path information of the piece of mail as a current delivering collector-distributor point.

The destination point labeling unit 1201 is configured to label the latitude-longitude coordinate of the destination point of the piece of mail within the latitude-longitude coordinate range of the current delivering collector-distributor point on the GIS map.

With the technical solution of the system embodiment of the disclosure, when the piece of mail is sorted at the collector-distributor point, the next collector-distributor point that the piece of mail is about to reach is determined based on the path information of the piece of mail without any experience, thereby avoiding human participation, reducing the human cost, and improving the transmission efficiency of the piece of mail. Furthermore, by labeling the destination point of each piece of mail on the GIS map, a geographic position of a consignee of each piece of mail is clear for the delivering courier, and the delivering courier can arrange the delivering path reasonably based on the destination points of all pieces of mail to be delivered, thereby saving the time for delivery and improving the efficiency of the delivery.

It should be noted that the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

For the method embodiment, the flows and steps of the technical solutions of the disclosure may be implemented in the server with a B/S structure or a C/S structure in the computer.

The apparatus embodiment substantially corresponds to the method embodiment, so the related parts between the apparatus embodiment and the method embodiment may be understood with reference to the illustration of the method embodiment. The apparatus embodiment described above is only exemplary, units illustrated as separate components may be physically separated or not. Components displayed as units may be physical units or not, i.e., the components may locate at one location or may be distributed on multiple network units. Part or all of the modules may be selected to implement the solutions of the embodiment based on actual requirement. Those skilled in the art may understand and implement the disclosure without any creative work.

The above are only embodiments of the application. It is to be noted that, several modifications and variations may be made by those skilled in the art without deviating from the principle of the application, which modifications and variations should be deemed as falling within the scope of protection of the application.

What is claimed is:

1. A method, comprising:
calculating a sender coordinate range indicative of a sender collection-distribution range of a sender collector-distributor point using a graphic information system (GIS) map;
calculating a destination coordinate range indicative of a destination collection-distribution range of a destination collector-distributor point using the GIS map;
responsive to receiving mail piece information, obtaining a sender coordinate, and a destination coordinate of the mail piece;
responsive to detecting the sender coordinate is within the sender coordinate range, identifying the sender collector-distributor point;
responsive to detecting the destination coordinate is within the destination coordinate range, identifying the destination collector-distributor point;
obtaining sender collector-distributor information of the sender collector-distributor point as identified, including a level of the sender collector-distributor point, and a first superordinate point to which the sender collector-distributor point belongs;
obtaining destination collector-distributor information of the destination collector-distributor point, including a level of the destination collector-distributor point, and a second superordinate point to which the destination collector-distributor point belongs;
calculating a mail path for the mail piece using the sender collector-distributor information and the destination collector-distributor information, wherein the mail path includes the sender collector-distributor point, the destination collector-distributor point, and a plurality of halfway collector-distributor points for the mail piece to pass; and
wherein the mail path is calculated prior to the mail piece depart from the sender collector-distributor point.

2. The method of claim 1, further comprising:
identifying a plurality of halfway collector-distributor points on the mail path based on the sender collector-distributor information and the destination collector-distributor information.

3. The method of claim 2, wherein the plurality of halfway collector-distributor points includes:
a first halfway collector-distributor point, and
a second halfway collector-distributor point subsequent to the first halfway collector-distributor point on the mail path.

4. The method of claim 1, wherein the mail piece information including a sender address, the method further comprising:
searching the sender address via the GIS map to obtain the sender coordinate.

5. The method of claim 1, wherein the mail piece information includes the sender coordinate obtained via a first satellite location device.

6. The method of claim 1, wherein the mail piece information includes a destination address, the method further comprising:
searching the destination address via the GIS map to obtain the destination coordinate.

7. The method of claim 1, wherein the mail piece information includes the destination coordinate obtained via a second satellite location device.

8. The method of claim 1, further comprising:
marking the destination coordinate on the GIS map.

9. A computing device, comprising:
an interface configured to receive mail piece information;
a human-machine interface (HMI) configured interact with a user; and a processor, configured to
calculate a sender coordinate range indicative of a sender collection-distribution range of a sender collector-distributor point;
calculate a destination coordinate range indicative of a destination collection-distribution range of a destination collector-distributor point;
responsive to receiving the mail piece information, obtain a sender coordinate, and a destination coordinate of the mail piece;
identify the sender coordinate is within the sender coordinate range, and the destination coordinate is within the destination coordinate range;
obtain sender collector-distributor information of the sender collector-distributor point, including a first superordinate point and a first subordinate point with which the sender collector-distributor point is associated;
obtain destination collector-distributor information of the destination collector-distributor point, including a second superordinate point and a second subordinate point with which the destination collector-distributor point is associated;
calculate an entire mail path for the mail piece using the sender collector-distributor and the destination collector-distributor information, wherein the entire mail path includes a plurality of halfway collector-distributor points for the mail piece to pass; and
wherein the entire mail path is calculated prior to the mail piece depart from the sender collector-distributor point.

10. The computing device of claim 9, wherein the processor is further configured to:
identify a plurality of halfway collector-distributor points on the entire mail path between the first superordinate point and second superordinate point, based on the sender collector-distributor information and the destination collector-distributor information.

11. The computing device of claim 10, wherein the plurality of halfway collector-distributor points including:
a first halfway collector-distributor point, and
a second halfway collector-distributor point subsequent to the first halfway collector-distributor point on the entire mail path,
the processor is further configured to:
send an instruction, via the interface, to the first halfway collector-distributor point to route the mail piece to the second halfway collector-distributor point.

12. The computing device of claim 9, wherein the mail piece information includes a sender address, and the processor is further configured to:
searching the sender address via the GIS map to obtain the sender coordinate.

13. The computing device of claim 9, wherein the mail piece information includes the sender coordinate obtained via a first satellite location device.

14. The computing device of claim 9, wherein the mail piece information includes a destination address, and the processor is further configured to:
searching the destination address via the GIS map to obtain the destination coordinate.

15. The computing device of claim 9, wherein the mail piece information includes the destination coordinate obtained via a second satellite location device.

16. A mail path calculation system, comprising:
an interface;
a human-machine interface (HMI) configured interact with a user; and a processor, configured to
calculate in advance a sender coordinate range indicative of a sender collection-distribution range of a sender collector-distributor point,
calculate in advance a destination coordinate range indicative of a destination collection-distribution range of a destination collector-distributor point,
receive, via the interface, a sender coordinate collected via a first satellite location device associated with a sender of a mail piece,
receive, via the interface, a destination coordinate collected via a second satellite location device associated with a recipient of the mail piece,
responsive to identifying the sender coordinate is within the sender coordinate range, and the destination coordinate is within the destination coordinate range, calculate the mail path for the mail piece between the sender collector-distributor point and the destination collector-distributor point based on the sender coordinate and the destination coordinate, wherein the mail path includes a plurality of halfway collector-distributor points for the mail piece to pass; and
wherein the mail path is calculated prior to the mail piece depart from the sender collector-distributor point.

17. The mail path calculation system of claim 16, wherein the processor is further configured to:
obtain sender collector-distributor information of the sender collector-distributor point, including a level of the sender collector-distributor point, and a first superordinate point to which the sender collector-distributor point belongs; and
obtain destination collector-distributor information of the destination collector-distributor point, including a level of the destination collector-distributor point, and a second superordinate point to which the destination collector-distributor point belongs.

18. The mail path calculation system of claim 17, wherein the processor is further configured to:
identify a plurality of halfway collector-distributor points on the mail path between the first superordinate point and second superordinate point, based on the sender collector-distributor information and the destination collector-distributor information,
wherein the plurality of halfway collector-distributor points including:
a first halfway collector-distributor point, and
a second halfway collector-distributor point subsequent to the first halfway collector-distributor point on the mail path,
the processor is further configured to:
send an instruction, via the interface, to the first halfway collector-distributor point to route the mail piece to the second halfway collector-distributor point.

* * * * *